US007875249B2

(12) United States Patent
Murakami et al.

(10) Patent No.: US 7,875,249 B2
(45) Date of Patent: Jan. 25, 2011

(54) REACTOR-INTEGRATED SYPHON

(75) Inventors: Takahiro Murakami, Tokyo (JP);
Koubun Kyo, Tokyo (JP); Toshiyuki Suda, Tokyo (JP)

(73) Assignee: IHI Corporation, Tokyo (JP)

( * ) Notice: Subject to any disclaimer, the term of this patent is extended or adjusted under 35 U.S.C. 154(b) by 332 days.

(21) Appl. No.: 12/064,572

(22) PCT Filed: Mar. 23, 2006

(86) PCT No.: PCT/JP2006/305786

§ 371 (c)(1),
(2), (4) Date: May 21, 2008

(87) PCT Pub. No.: WO2007/023590

PCT Pub. Date: Mar. 1, 2007

(65) Prior Publication Data

US 2009/0191104 A1 Jul. 30, 2009

(30) Foreign Application Priority Data

Aug. 26, 2005 (JP) ............................. 2005-246251

(51) Int. Cl.
*F27B 15/06* (2006.01)
*F23G 5/00* (2006.01)
(52) U.S. Cl. .................. 422/145; 422/139; 110/245
(58) Field of Classification Search ................. 422/139, 422/145; 110/245
See application file for complete search history.

(56) References Cited

U.S. PATENT DOCUMENTS

| 4,969,930 A | 11/1990 | Arpalahti |
| 5,078,100 A * | 1/1992 | Huschauer et al. .......... 122/4 D |
| 5,140,950 A * | 8/1992 | Abdulally ................... 122/4 D |
| 5,141,708 A * | 8/1992 | Campbell et al. ........... 422/142 |

(Continued)

FOREIGN PATENT DOCUMENTS

JP   51 117849   3/1975

(Continued)

OTHER PUBLICATIONS

U.S. Appl. No. 11/916,365, filed Dec. 3, 2007, Kyo et al.

(Continued)

*Primary Examiner*—Walter D Griffin
*Assistant Examiner*—Huy-Tram Nguyen
(74) *Attorney, Agent, or Firm*—Oblon, Spivak, McClelland, Maier & Neustadt, L.L.P.

(57) ABSTRACT

In order to improve sealing properties between a downcomer and a high-speed layer and in order to efficiently take out produced gas obtained through gasification of, for example, a solid reactant, a syphon for sealing between a downcomer and a high-speed layer through temporary storage of particles moving from the downcomer to the high-speed layer comprises a reactor portion for causing the solid reactant to conduct chemical reaction through action of the particles, a downcomer seal portion in communication, at upper and lower ends thereof, with the downcomer and a lower portion the reactor portion, respectively, a particle outlet seal portion provided in a spaced apart relationship from the downcomer seal portion and in communication, at upper and lower ends thereof, with the high-speed layer and the lower portion of the reactor portion, respectively, and a freeboard portion formed above the reactor portion.

4 Claims, 6 Drawing Sheets

U.S. PATENT DOCUMENTS

| | | | |
|---|---|---|---|
| 5,239,946 A * | 8/1993 | Garcia-Mallol | 122/4 D |
| 5,339,774 A | 8/1994 | Tang | |
| 5,682,828 A * | 11/1997 | Phalen et al. | 110/245 |
| 6,269,778 B1 * | 8/2001 | Anderson et al. | 122/4 D |
| 6,418,866 B1 | 7/2002 | Shimizu et al. | |
| 6,923,128 B2 * | 8/2005 | Seeber | 110/245 |
| 7,240,639 B2 | 7/2007 | Hyppanen et al. | |
| 7,543,553 B2 * | 6/2009 | Watanabe | 122/4 D |
| 2005/0064357 A1 * | 3/2005 | Watanabe | 432/14 |

FOREIGN PATENT DOCUMENTS

| | | |
|---|---|---|
| JP | 63 4840 | 1/1988 |
| JP | 2 122826 | 5/1990 |
| JP | 2002 206717 | 7/2002 |

OTHER PUBLICATIONS

U.S. Appl. No. 11/813,250, filed Jul. 2, 2007, Murakami et al.

* cited by examiner

REACTOR-INTEGRATED SYPHON

TECHNICAL FIELD

The present invention relates to a reactor-integrated syphon and more specifically relates to technique for improving sealing properties between a downcomer and a high-speed layer while produced gas is taken out by reacting, for example, a solid reactant through action of particles moving from the downcomer to the high-speed layer.

BACKGROUND ART

A syphon (also called as sealed pot) provided between a downcomer and a high-speed layer generally has a function of controlling fluidization of particles from a downcomer to a high-speed layer and a function of preventing high-speed fluid fluidizing through the high-speed layer from drifting into the syphon or the downcomer, i.e., a function of sealing between the downcomer and the high-speed layer (see, for example, Reference 1).

In such syphon, generally, the fluidizing particles are adapted to fall from the downcomer into the syphon by their own weight.

Recent tendency is to supply, for example, a solid reactant to such syphon and cause the solid reactant to conduct chemical reaction through the use of energy such as heat energy of the particles into gasification, resultant produced gas being withdrawn as product gas.

[Reference 1] JP 2002-206717A

SUMMARY OF THE INVENTION

Problems to be Solved by the Invention

However, there is a problem that, when the chemical reaction of the solid reactant is concurrently conducted in the syphon disclosed for example in the above Reference 1, resultant produced gas flows to the high-speed layer. There is also a problem that, if a partition wall below the downcomer has insufficiencies, the produced gas flows to the downcomer.

In other words, the syphon disclosed for example in the Reference 1 with inferior sealing properties between the downcomer and the high-speed layer has a problem that, upon concurrent trial of gasifying the solid reactant, efficient withdrawal of only produced gas cannot be conducted.

The present invention was made for solution of the above problems and has its object to provide a reactor-integrated syphon which can improve sealing properties between a downcomer and a high-speed layer and can efficiently take out produced gas through gasification of, for example, solid reactant.

Means or Measures for Solving the Problems

In order to attain the above-mentioned object, the invention is directed to a reactor-integrated syphon provided between a downcomer and a high-speed layer for sealing fluidization of gas between the downcomer and the high-speed layer through temporary storage of particles moving from the downcomer to the high-speed layer, said reactor-integrated syphon comprising a reactor portion for causing the solid reactant to conduct chemical reaction through action of said particles, a downcomer seal portion in communication, at upper and lower ends thereof, with said downcomer and a lower portion of said reactor portion, respectively, for circulating said particles from said downcomer into said reactor portion, a particle outlet seal portion provided in a spaced apart relationship from said downcomer seal portion and in communication, at upper and lower ends thereof, with said high-speed layer and said lower portion of said reactor portion, respectively, for circulating said particles from said reactor portion into said high-speed layer and a freeboard portion formed above said reactor portion for further acceleration of the reaction of gas resulting from said chemical reaction of said solid reactant.

In other words, in a syphon according to the invention, a downcomer-side downcomer seal portion and a high-speed-layer-side particle outlet seal portion are provided independently and spaced apart from each other, reactor and freeboard portions being formed between the downcomer seal portion and the particle outlet seal portion.

Thus, the particles are stored in the downcomer seal, particle outlet seal and reactor portions and the sealing properties between the downcomer and the high-speed layer are improved; when for example a solid reactant is gasified in the reactor portion through the action of the particles moving from the downcomer to the high-speed layer, the reaction of the resultant produced gas is further accelerated in the freeboard portion and the produced gas is prevented from drafting into the downcomer and into the high-speed layer.

In the reactor-integrated syphon, the downcomer seal portion effectively seals against flow of the gas in the reactor and freeboard portions into the downcomer.

Thus, the produced gas is reliably prevented from drafting into the downcomer.

In the reactor-integrated syphon, the particle outlet seal portion can also seal against flow of the gas in the reactor and freeboard portions into the high-speed layer.

Thus, the produced gas is reliably prevented from drafting into the high-speed layer.

The reactor-integrated syphon may further comprise a pressure controller for control of pressure difference between pressures in the reactor and particle outlet seal portions, transportation amount of the particles being adjustable through control of the pressure difference by the pressure controller.

More specifically, the particles moves from the downcomer via the down corner seal, reactor and particle outlet seal portions to the high-speed layer. The particles stored in the reactor portion serve as buffer for the particles moving from the downcomer to the high-speed layer and transportation amount of the particles mainly depends on pressure difference between the pressures in the reactor and particle outlet seal portions. As a result, the transportation amount of the particles is satisfactorily adjusted through control of the pressure difference between the pressures in the reactor and particle outlet seal portions by the pressure controller.

Effects of the Invention

According to a reactor-integrated syphon of the invention, the sealing properties between the downcomer and the high-speed layer can be improved; the reaction of the produced gas obtained through gasification of, for example, a solid reactant in the reactor portion through the action of the particles moving from the downcomer to the high-speed layer is further accelerated in the freeboard portion and the produced gas is prevented from drafting into the downcomer and into the high-speed layer. Thus, the produced gas can be efficiently taken out as product gas.

In the reactor-integrated syphon of the invention, the downcomer seal portion seals against flow of the gas in the reactor and freeboard portions into the downcomer, so that the produced gas can be reliably prevented from drafting into the downcomer.

In the reactor-integrated syphon of the invention, the particle outlet seal portion seals against flow of the gas in the reactor and freeboard portions into the high-speed layer, so that the produced gas can be reliably prevented from drafting into the high-speed layer.

The reactor-integrated syphon of the invention may further comprise a pressure controller for control of pressure difference between pressures in the reactor and particle outlet seal portions, transportation amount of the particles being adjusted through control of the pressure difference by the pressure controller; then, the transportation amount of the particles can be easily and properly adjusted through control of the pressure difference between the pressures in the reactor and particle outlet seal portions. Thus, production amount of, for example, produced gas can be easily adjusted and the produced gas can be taken out further efficiently.

Figure 1:
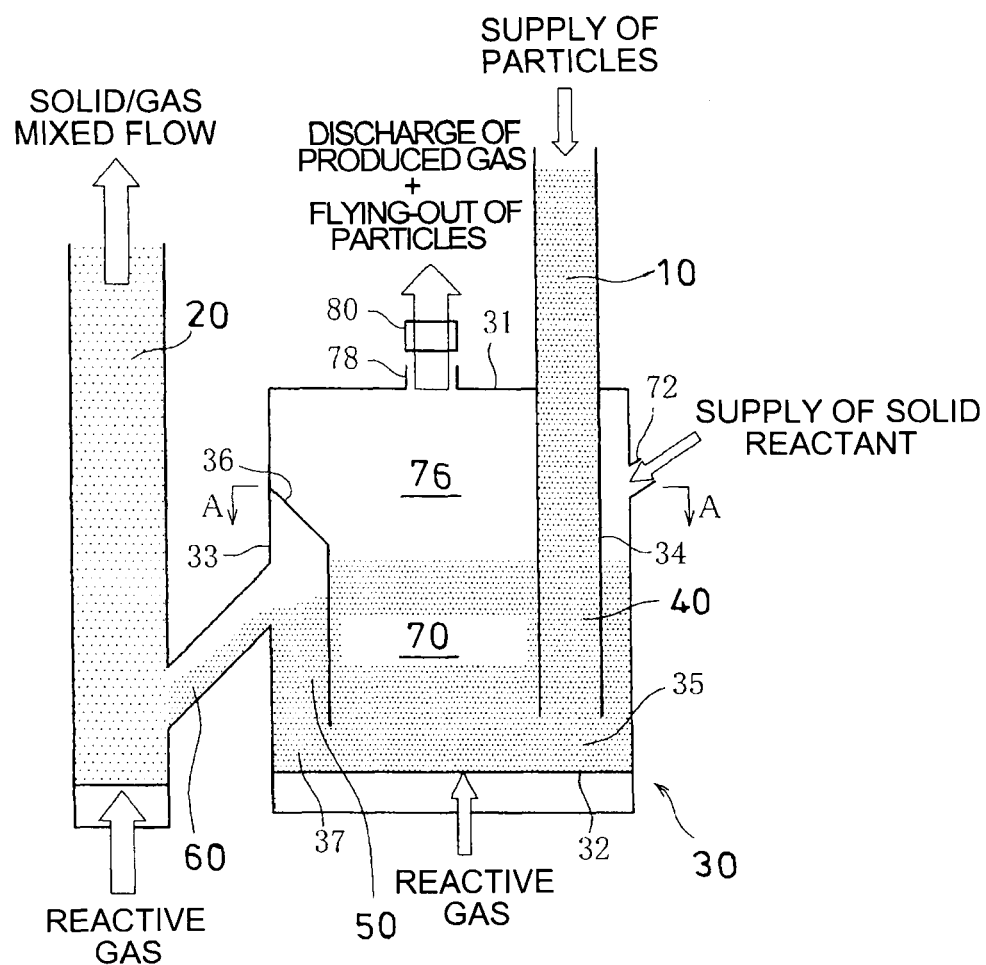
FIG. 1 is a schematic view showing overall construction of a reactor-integrated syphon according to a first embodiment of the invention.

EXPLANATION OF THE REFERENCE NUMERALS 10 downcomer
20 high-speed layer
30 syphon
34 partition wall
36 partition wall
40 downcomer seal portion
50 particle outlet seal portion
70 reactor portion
72 charge port
76 freeboard (freeboard portion)
78 produced gas take-out port
80 pressure controller

BEST MODE FOR CARRYING OUT THE INVENTION

First of all, a first embodiment will be described.

Reference is made to FIG. 1 which is a schematic view showing overall construction of a reactor-integrated syphon according to the first embodiment of the invention and. The description will be made on the basis of the figure.

In the first embodiment, a reactor-integrated syphon comprises a syphon 30 provided between a downcomer 10 where fluid heating medium (particles, sand or the like) fluidizes at lower speed and a high-speed layer 20 where the fluid heating medium is heated to fluidize at higher speed, said syphon 30 having a function of sealing between the downcomer 10 and high-speed layer 20.

In the syphon 30, a downcomer seal portion 40 is formed through partitioning by a partition wall 34 extending downward from an upper wall 31, the downcomer seal portion 40 extending at its upper end through the upper wall 31 to be in communication with the downcomer 10. Specifically, the partition wall 34 is a cylinder integral with the downcomer 10 and extending to a vicinity of a bottom wall 32 of the syphon 30 to provide a constant gap 35 at a lower end of the partition wall 34, i.e., between the downcomer seal portion 40 and the bottom wall 32.

On the other hand, formed in a spaced apart (separated) relationship from the downcomer seal portion 40 is a particle outlet seal portion 50 partitioned by a partition wall 36 extending downwardly from an upper portion of a side wall 33 of the syphon 30, an upper end of the particle outlet seal portion 50 being in communication with the high-speed layer 20 via a communicating passage 60 positioned at a center of the side wall 33 with respect to height of the syphon 30. Specifically, just like the partition wall 34, the partition wall 36 extends to a vicinity of the bottom wall 32 of the syphon 30 to provide a constant gap 37 at the lower end of the partition wall 36, i.e., between the particle outlet seal portion 50 and the bottom wall 32.

A constant space is formed in the syphon 30 between the downcomer seal portion 40 and the particle outlet seal portion 50 to provide a reactor portion 70. A lower portion of the reactor portion 70 is in communication with the lower ends of the downcomer seal and particle outlet portions 40 and 50 via the gaps 35 and 37, respectively.

Figure 2:
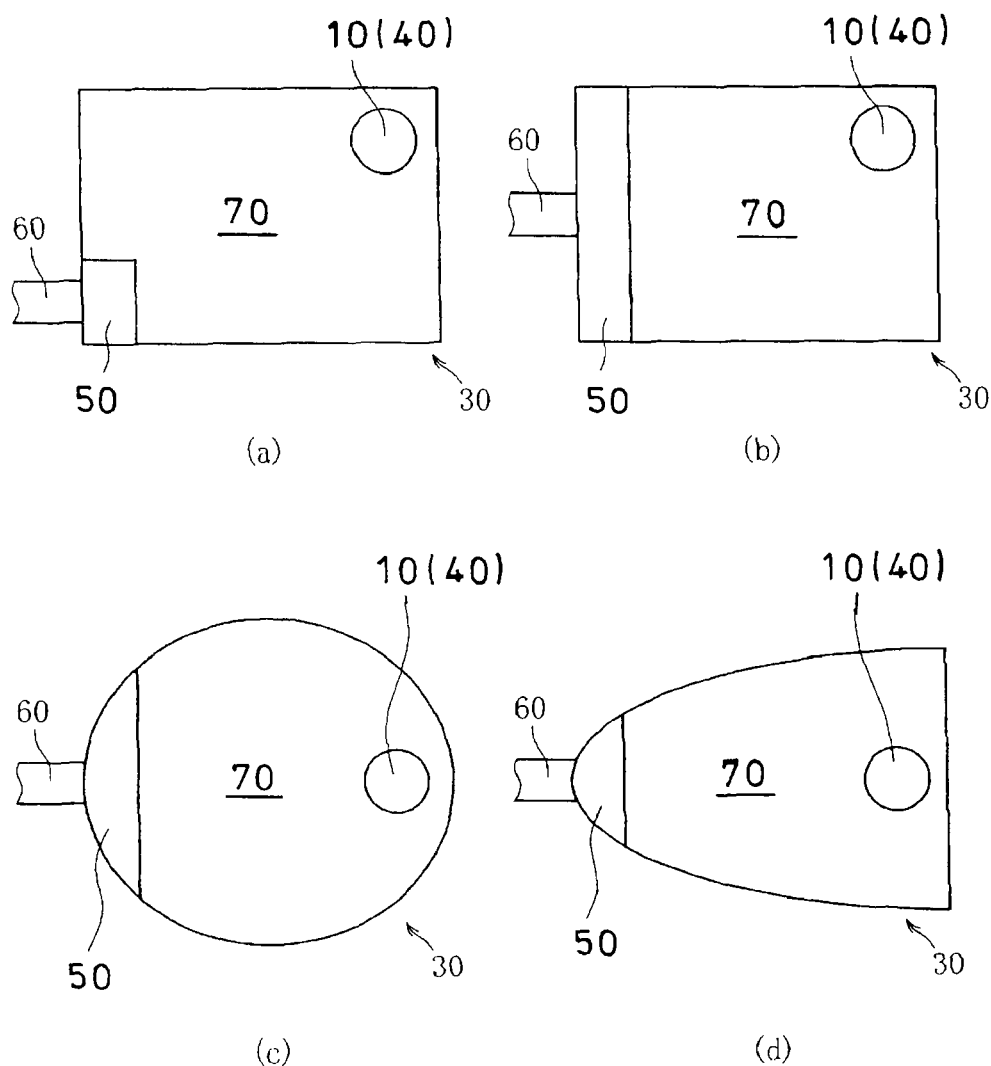
FIG. 2 shows sections of the syphons taken along line A-A in FIG. 1.

Reference is made to FIG. 2 which shows sections of the syphons taken along line A-A in FIG. 1. As shown in the figure, there may be various possibilities in sectional shape of the syphon 30 and in position relationship between the downcomer seal and particle outlet seal portions 40 and 50. Exemplarily shown here are four patterns: (a) the syphon 30 has a rectangular section and the downcomer seal portion 40 and the particle outlet seal portion 50 are at opposite corners; (b) the syphon 30 has a rectangular section and the particle outlet seal portion 50 extends all over the width of the syphon 30; (c) the syphon 30 has a circular section; and (d) the syphon 30 has a section convergent toward the particle outlet seal portion 50.

Thus, the fluid heating medium is supplied via the downcomer 10 (supply of particles) and stored in the downcomer seal portion 40; then, the fluid heating medium passes through the gap 35 and flows into the reactor portion 70 and stored therein. Concurrently, the fluid heating medium also passes through the gap 37 and is stored in the particle outlet seal portion 50. When the stored height of the fluid heating medium reach the position of the communicating passage 60 at the center of the side wall 33, then the fluid heating medium in the particle outlet seal portion 50 is supplied via the communicating passage 60 to the high-speed layer 20. Following this, the stored height (level) of the fluid heating medium in the reactor portion 70 stabilizes to a given position depending upon the pressure in the reactor portion 70.

The reactor portion 70 of the syphon 30 is provided with a charge port 72 through which solid reactant (coal, biomass, waste product or the like) is properly supplied to the reactor portion 70. Thus supplied solid reactant conducts chemical reaction (for example, pyrolysis) into gasification through utilization of energy (mainly, heat energy) possessed by the fluid heating medium and reactive gas (for example, steam or $CO_2$) supplied to the reactor portion 70 via the bottom wall 32, resultant produced gas moves above the reactor portion

70. Specifically, a space in the reactor portion 70 above a level surface of the fluid heating medium provides a freeboard (freeboard portion) 76 where the produced gas is accelerated in reaction.

The upper wall 31 of the syphon 30 is formed with a produced gas take-out port 78 for taking out the produced gas from the freeboard 76, the produced gas passing through the freeboard 76 being taken out outside through the take-out port 78 (discharge of produced gas). Part of particles in the fluid heating medium and solid reactant may fly out together with the produced gas via the take-out port 78 (flying-out of particles), these particles being returned via a cyclone (not shown) to the reactor portion 70.

For example, remaining char in the gasification process is transported together with the fluid heating medium via the communicating passage 60 into the high-speed layer 20 where it is burned by reactive gas (air or the like) supplied to the high-speed layer 20 from below. Thus, in the high-speed layer 20, the fluid heating medium is heated and fluidized at higher speed through combustion gas generated by combustion of the char (solid/gas mixed flow).

As is explained in the above with respect to a reactor-integrated syphon according to the invention, the downcomer-side downcomer seal portion 40 and the high-speed-layer-side particle outlet seal portion 50 are provided in the syphon 30 independently and spaced apart from each other. As a result, improved in comparison with the conventional structures are sealing properties between the downcomer 10 and the high-speed layer 20.

In the reactor-integrated syphon, the space between the downcomer seal and particle outlet seal portions 40 and 50 is utilized as reactor portion 70 for gasification of the solid reactant, resultant produced gas being further accelerated in reaction in the freeboard 76 and being taken out; the freeboard 76 is positioned above the reactor portion 70 and is completely separated from the downcomer seal and particle outlet seal portions 40 and 50, so that all of the produced gas produced in the reactor portion 70 passes through the freeboard 76, which reliably prevents the produced gas from drafting to the downcomer 10 and to the high-speed layer 20. At the same time, the combustion gas is favorably prevented from flowing from the high-speed layer 20 back into the reactor portion 70. Thus, all of the produced gas produced in the reactor portion 70 can be efficiently taken out as product gas.

In this way, when the downcomer seal and particle outlet seal portions 40 and 50 are provided independently and spaced apart from each other in the syphon 30 and the fluid heating medium is stored in the reactor portion 70, the fluid heating medium stored in the reactor portion 70 serves as buffer for the fluid heating medium moving from the downcomer 10 to the high-speed layer 20. As a result, transportation amount of the fluid heating medium from the downcomer 10 to the high-speed layer 20 mainly depends on pressure difference between the pressures in the reactor and particle outlet seal portions 70 and 50.

That is, by controlling pressure difference between the pressures in the reactor and particle outlet seal portions 70 and 50, the transportation amount of the fluid heating medium can be easily and properly adjusted.

Therefore, in the embodiment, pressure difference between the pressures in the reactor and particle outlet seal portions 70 and 50 is adjusted to properly control the transportation amount of the fluid heating medium. To be more precise, the syphon 30 is provided with a pressure controller (for example, IDF (induced-draft fan) or electromagnetic valve) 80 which is controlled such that pressure difference between the pressures in the reactor and particle outlet seal portions 70 and 50 becomes that corresponding to a desired transportation amount of the fluid heating medium.

Thus, production amount of the produced gas produced, for example, in the reactor portion 70 can be easily controlled and the produced gas can be taken out further efficiently.

Next, a second embodiment will be described.

Figure 3:
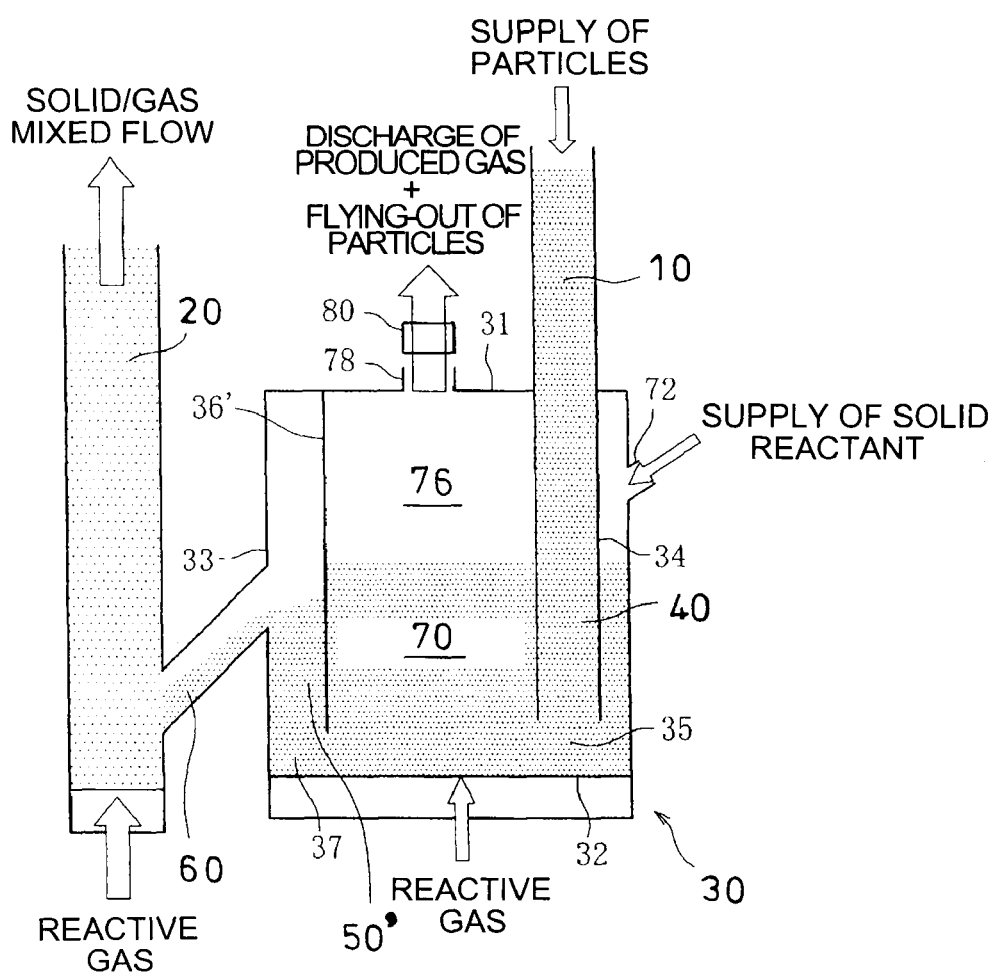
FIG. 3 is a schematic view showing overall construction of a reactor-integrated syphon according to a second embodiment of the invention.

Reference is made to FIG. 3 which is a schematic view showing overall construction of a reactor-integrated syphon according to the second embodiment of the invention. The description will made on the basis of the figure. Parts identical with those in the syphon of the above first embodiment are denoted by the same reference numerals and explanations therefor are omitted.

In the second embodiment, formed in a spaced apart relationship from a downcomer seal portion 40 is a particle outlet seal portion 50' partitioned by a partition wall 36' extending downwardly from an upper wall 31 of a syphon 30.

Also in such construction, in the syphon 30, a downcomer-side downcomer seal portion 40 and a high-speed-layer-side particle outlet seal portion 50' are provided independently and spaced apart from each other, so that, like the above first embodiment, sealing properties between a downcomer 10 and a high-speed layer 20 are improved.

A freeboard 76 is completely separated from the downcomer seal and particle outlet seal portions 40 and 50', so that, like the above first embodiment, produced gas is reliably prevented from drafting to the downcomer 10 and the high-speed layer 20, whereby the produced gas produced in the reactor portion 70 can be efficiently taken out as product gas.

Next, a third embodiment will be described.

Figure 4:
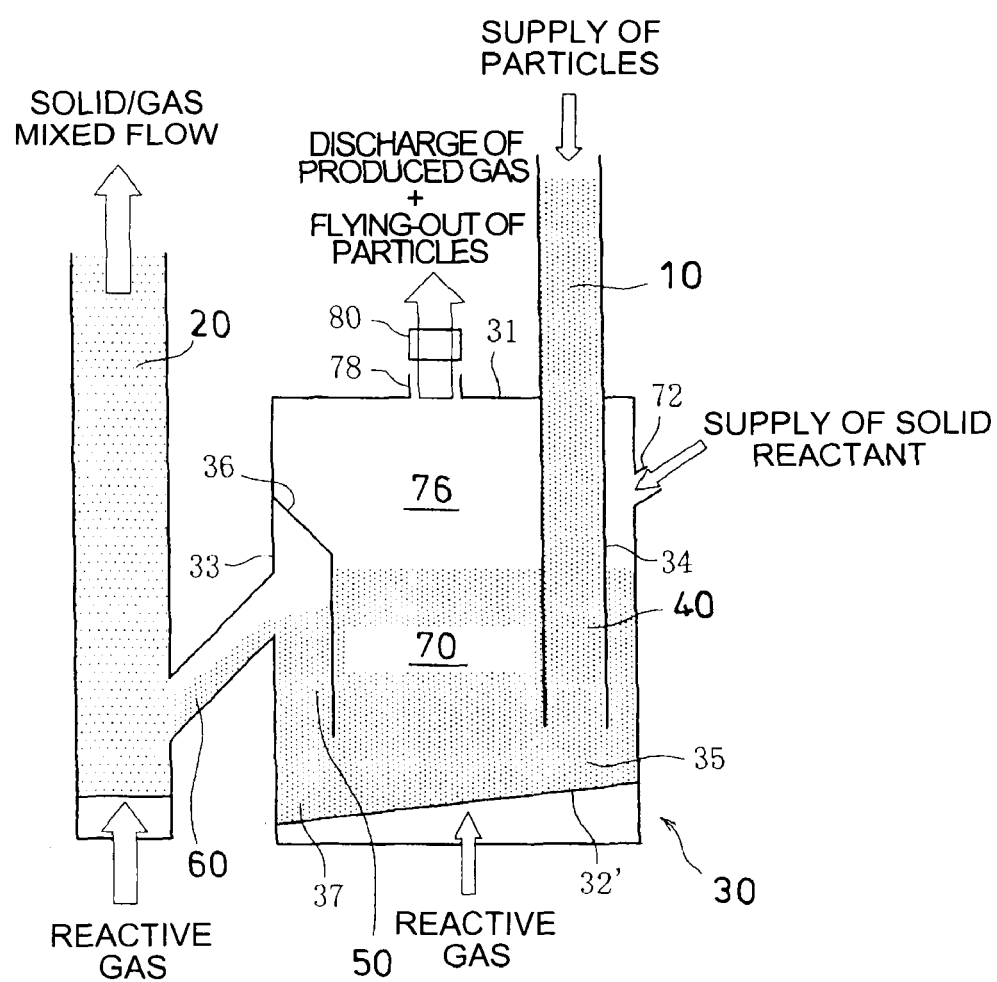
FIG. 4 is a schematic view showing overall construction of a reactor-integrated syphon according to a third embodiment of the invention.

Reference is made to FIG. 4 which is a schematic view showing overall construction of a reactor-integrated syphon according to the third embodiment of the invention. The description will be made on the basis of the figure. Also, parts identical with those in the syphon according to the above-mentioned first embodiment are denoted by the same reference numerals and explanations therefor are omitted.

In the third embodiment, a bottom wall 32' is adapted to be slant downwardly from the downcomer seal portion 40 side to the particle outlet seal portion 50 side.

Such construction can have not only the effects similar to those obtained in the above first embodiment but also an effect that, in the syphon 30, the fluid heating medium and char are transported from the downcomer seal portion 40 to the particle outlet seal portion 50 smoothly and without stagnation.

Next, a fourth embodiment will be described.

Figure 5:
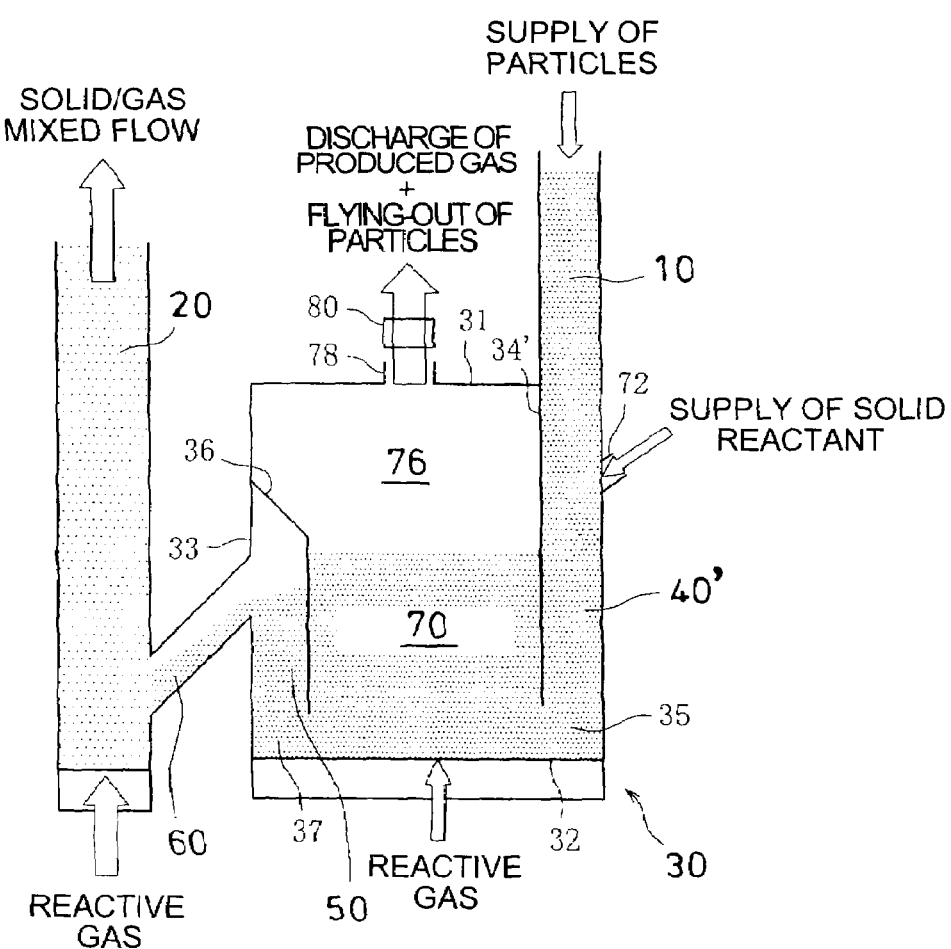
FIG. 5 is a schematic view showing overall construction of a reactor-integrated syphon according to a fourth embodiment of the invention.

Reference is made to FIG. 5 which is a schematic view showing overall construction of a reactor-integrated syphon according to the fourth embodiment of the invention. The description is made on the basis of the figure. Also, parts identical with those in the syphon of the above first embodiment are denoted by the same reference numerals and explanations therefor are omitted.

In the fourth embodiment, a downcomer seal portion 40' substitutes for the cylindrical downcomer seal portion 40 and is formed by partitioning for example a corner of the syphon 30 by means of a partition wall 34' extending downwardly from an upper wall 31 of a syphon 30.

Also in such construction, in the syphon 30, a downcomer-side downcomer seal portion 40' and a high-speed-layer-side particle outlet seal portion 50 are arranged independently and spaced apart from each other, so that, like the above first embodiment, sealing properties between a downcomer 10 and a high-speed layer 20 are improved.

A freeboard 76 is completely separated from the downcomer seal and particle outlet seal portions 40' and 50, so that, like the above first embodiment, the produced gas is reliably prevented from drafting into the downcomer 10 and the high-speed layer 20, whereby the produced gas produced in the reactor portion 70 can be efficiently taken out as product gas.

In FIG. 5, it may look like that the charge port 72 for the solid reactant is provided on the downcomer seal portion 40'; however, in fact, like the first embodiment, the charge port 72 is provided on the reactor portion 70 at a position deviating from the downcomer seal portion 40'.

Next, a fifth embodiment will be described.

Figure 6:
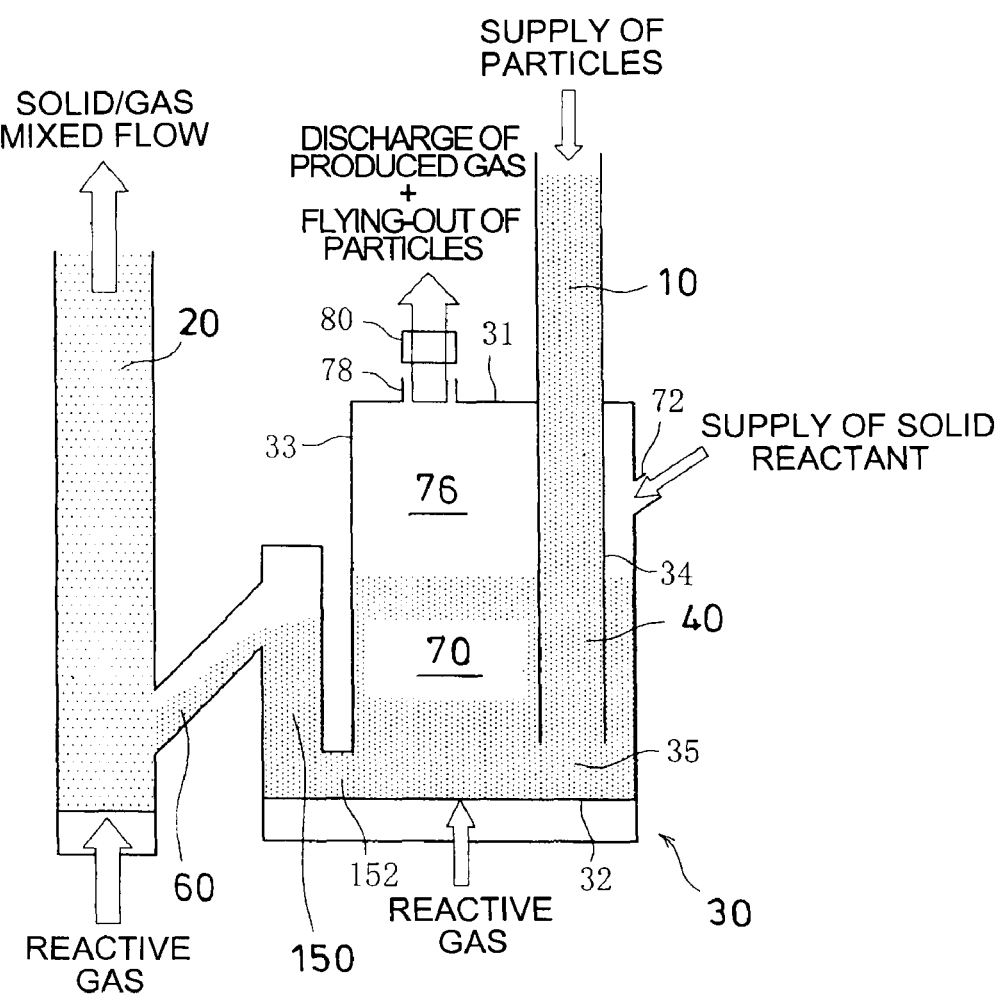
FIG. 6 is a schematic view showing overall construction of a reactor-integrated syphon according to a fifth embodiment of the invention.

Reference is made to FIG. 6 which is a schematic view showing overall construction of a reactor-integrated syphon according to the fifth embodiment of the invention. The description is made on the basis of the figure. Also, parts identical with those in the syphon of the above first embodiment are denoted by the same reference numerals and explanations therefor are omitted.

In the fifth embodiment, formed in a spaced apart relationship from a downcomer seal portion 40 is a particle outlet seal portion 150. The particle outlet seal portion 150 is in the shape of a tower completely independent from the reactor portion 70 and in communication with a lower portion of a reactor portion 70 via a communicating passage 152 (L-shaped seal).

Also in this construction, in a syphon 30, a downcomer-side downcomer seal portion 40 and a high-speed-layer-side particle outlet seal portion 150 are provided independently and spaced apart from each other, so that like the above first embodiment, sealing properties between a downcomer 10 and a high-speed layer 20 are improved.

A freeboard 76 is completely separated from the downcomer seal and particle outlet seal portions 40 and 150, so that, like the above first embodiment, produced gas is reliably prevented from drafting into the downcomer 10 and into the high-speed layer 20 and produced gas produced in the reactor portion 70 can be efficiently taken out as product gas.

The description on the embodiments of a reactor-integrated syphon according to the invention now finishes. It is to be understood that the embodiments are not limited to the above embodiments and that various changes and modifications may be made within the spirit of the invention.

INDUSTRIAL APPLICABILITY

A reactor-integrated syphon according to the invention is applicable to a twin-tower type fluidized bed gasification furnace.

The invention claimed is:

1. A reactor-integrated syphon provided between a downcomer and a high-speed layer for sealing fluidization of gas between the downcomer and the high-speed layer through temporary storage of particles moving from the downcomer to the high-speed layer, said reactor-integrated syphon comprising:

a reactor portion for causing the solid reactant to conduct chemical reaction through action of said particles, a downcomer seal portion in communication, at upper and lower ends thereof, with said downcomer and a lower portion of said reactor portion, respectively, for circulating said particles from said downcomer into said reactor portion, a particle outlet seal portion provided in a spaced apart relationship from said downcomer seal portion and in communication, at upper and lower ends thereof, with said high-speed layer and said lower portion of said reactor portion, respectively, for circulating said particles from said reactor portion into said high-speed layer, a freeboard portion formed above said reactor portion for further acceleration of the reaction of gas resulting from said chemical reaction of said solid reactant, and a produced gas take-out port for taking out the produced gas from said freeboard portion, the reactor-integrated syphon further comprising a pressure controller arranged downstream of said produced gas taken-out port for controlling pressure difference between the pressures in the reactor and particle outlet seal portions, transportation amount of said particles being adjusted through control of the pressure difference by said pressure controller.

2. A reactor-integrated syphon provided between a downcomer and a high-speed layer for sealing fluidization of gas between the downcomer and the high-speed layer through temporary storage of particles moving from the downcomer to the high-speed layer, said reactor-integrated syphon comprising:

a reactor portion for causing the solid reactant to conduct chemical reaction through action of said particles, a downcomer seal portion in communication, at upper and lower ends thereof, with said downcomer and a lower portion of said reactor portion, respectively, for circulating said particles from said downcomer into said reactor portion, a particle outlet seal portion provided in a spaced apart relationship from said downcomer seal portion and in communication, at upper and lower ends thereof, with said high-speed layer and said lower portion of said reactor portion, respectively, for circulating said particles from said reactor portion into said high-speed layer, a freeboard portion formed above said reactor portion for further acceleration of the reaction of gas resulting from said chemical reaction of said solid reactant, and a produced gas take-out port for taking out the produced gas from said freeboard portion, wherein said downcomer seal portion seals against flow of the gas in the reactor and freeboard portions into the downcomer, the reactor-integrated siphon further comprising a pressure controller arranged downstream of said produced gas taken-out port for controlling pressure difference between the pressures in the reactor and particle outlet seal portions, transportation amount of said particles being adjusted through control of the pressure difference by said pressure controller.

3. A reactor-integrated syphon provided between a downcomer and a high-speed layer for sealing fluidization of gas between the downcomer and the high-speed layer through temporary storage of particles moving from the downcomer to the high-speed layer, said reactor-integrated syphon comprising:

a reactor portion for causing the solid reactant to conduct chemical reaction through action of said particles, a downcomer seal portion in communication, at upper and lower ends thereof, with said downcomer and a lower portion of said reactor portion, respectively, for circulating said particles from said downcomer into said reactor portion, a particle outlet seal portion provided in a spaced apart relationship from said downcomer seal portion and in communication, at upper and lower ends thereof, with said high-speed layer and said lower portion of said reactor portion, respectively, for circulating said particles from said reactor portion into said high-speed layer, a freeboard portion formed above said reactor portion for further acceleration of the reaction of gas resulting from said chemical reaction of said solid reactant, and a produced gas take-out port for taking out the produced gas from said freeboard portion, wherein said particle outlet seal portion seals against flow of the gas in the reactor and freeboard portions into the high-speed layer, the reactor-integrated siphon further comprising a pressure controller arranged downstream of said produced gas taken-out port for controlling pressure difference between the pressures in the reactor and particle outlet seal portions, transportation amount of said particles being adjusted through control of the pressure difference by said pressure controller.

4. A reactor-integrated syphon provided between a downcomer and a high-speed layer for sealing fluidization of gas between the downcomer and the high-speed layer through temporary storage of particles moving from the downcomer to the high-speed layer, said reactor-integrated syphon comprising:

a reactor portion for causing the solid reactant to conduct chemical reaction through action of said particles, a downcomer seal portion in communication, at upper and lower ends thereof, with said downcomer and a lower portion of said reactor portion, respectively, for circulating said particles from said downcomer into said reactor portion, a particle outlet seal portion provided in a spaced apart relationship from said downcomer seal portion and in communication, at upper and lower ends thereof, with said high-speed layer and said lower portion of said reactor portion, respectively, for circulating said particles from said reactor portion into said high-speed layer, a freeboard portion formed above said reactor portion for further acceleration of the reaction of gas resulting from said chemical reaction of said solid reactant, and a produced gas take-out port for taking out the produced gas from said freeboard portion, wherein said downcomer seal portion seals against flow of the gas in the reactor and freeboard portions into the downcomer, and wherein said particle outlet seal portion seals against flow of the gas in the reactor and freeboard portions into the high-speed layer, the reactor-integrated siphon further comprising a pressure controller arranged downstream of said produced gas taken-out port for controlling pressure difference between the pressures in the reactor and particle outlet seal portions, transportation amount of said particles being adjusted through control of the pressure difference by said pressure controller.

* * * * *